United States Patent [19]

Ovshinsky et al.

[11] 4,431,561

[45] Feb. 14, 1984

[54] HYDROGEN STORAGE MATERIALS AND METHOD OF MAKING SAME

[75] Inventors: Stanford R. Ovshinsky, Bloomfield Hills; Krishna Sapru, Troy; Krystyna Dec, Troy; Kuochih Hong, Troy, all of Mich.

[73] Assignee: Energy Conversion Devices, Inc., Troy, Mich.

[21] Appl. No.: 372,665

[22] Filed: Apr. 28, 1982

[51] Int. Cl.$^3$ .................... C01B 3/02; F17C 11/00
[52] U.S. Cl. .................... 252/184; 48/190; 206/0.6; 206/0.7; 252/188.26; 252/188.28; 423/648 R
[58] Field of Search .............. 252/184, 188.26, 188.28; 48/190; 206/0.6, 0.7; 423/648 R

[56] References Cited

U.S. PATENT DOCUMENTS 3,666,412  5/1972  Sowards .................... 423/648 R
4,265,720  5/1981  Winstel .................... 204/129

*Primary Examiner*—Irwin Gluck
*Attorney, Agent, or Firm*—Lawrence G. Norris

[57] ABSTRACT

A material for reversibly storing hydrogen is formed from a lightweight matrix which is chemically and structurally modified to improve its hydrogen storage properties. The utilization of a material which can be any of a number of different disordered structures makes possible the modification of local order chemical environments of the material to increase hydrogen storage capacity and/or improve absorption and desorption properties. Lightweight modifier elements structurally modify the local chemical environments of the matrix to provide a material having a increased density of storage sites to increase hydrogen storage capacity. Transition and rare earth modifier elements structurally modify the local chemical environments to provide a material with an increased density of catalytically active sites for dissociating hydrogen molecules to increase the rate at which hydrogen absorption and desorption can be accomplished. The transition and rare earth modifier elements also structurally modify local order chemical environments to provide sites which store hydrogen atoms at lower bond energies to significantly reduce hydrogen desorption temperatures.

23 Claims, No Drawings

HYDROGEN STORAGE MATERIALS AND METHOD OF MAKING SAME

BACKGROUND OF THE INVENTION

The present invention is directed generally to solid materials which are capable of reversibly absorbing hydrogen gas. These materials can be utilized for a variety of applications. The applications include on board storage of hydrogen for vehicle fuel supplies, storage of hydrogen during transport to other facilities, storage of hydrogen for future use as a fuel to power machinery and equipment and storage of hydrogen for powering fuel cells for producing electricity. These materials can be utilized in heat pump systems and gas recovery systems.

In recent years considerable attention has been given to the use of hydrogen as a fuel or fuel supplement. While the world's oil reserves are rapidly being depleted, the supply of hydrogen remains virtually unlimited. Hydrogen can be produced from coal or formed by the electrolysis of water. Moreover hydrogen can be produced without the use of fossil fuels, such as by the electrolysis of water using nuclear or solar energy. Furthermore, hydrogen, although presently more expensive than petroleum, is a relatively low cost fuel. Hydrogen has the highest density of energy per unit weight of any chemical fuel. It is essentially non-polluting since the main by-product of burning hydrogen is water.

While hydrogen has wide potential application as a fuel, a major drawback in its utilization, especially in mobile uses such as the powering of vehicles, has been the lack of acceptable lightweight hydrogen storage medium. Storage of hydrogen as a compressed gas involves the use of large and heavy vessels. In a steel vessel or tank of common design only about 1% of the total weight is comprised of hydrogen gas when it is stored in the tank at a typical pressure of 136 atmospheres. In order to obtain equivalent amounts of energy, a container of hydrogen gas weighs about thirty times the weight of a container of gasoline.

Hydrogen also can be stored as a liquid. Storage as a liquid, however, presents a serious safety problem when used as a fuel for motor vehicles since hydrogen is extremely flammable. Liquid hydrogen also must be kept extremely cold, below −253° C., and is highly volatile if spilled. Moreover, liquid hydrogen is expensive to produce and the energy necessary for the liquefaction process is a major fraction of the energy that can be generated by burning the hydrogen.

Storage of hydrogen as a solid hydride can provide a greater percent weight storage than storage as a compressed gas or a liquid in pressure tanks. Also, hydrogen storage in a solid hydride presents fewer safety problems than those caused by hydrogen stored in containers as a gas or a liquid. A desirable hydrogen storage material must have a high storage capacity relative to the weight of the material, a suitable desorption temperature, good kinetics, good reversibility, resistance to poisoning by contaminants including those present in the hydrogen gas and be of a relatively low cost. If the material fails to possess any one of these characteristics it will not be acceptable for wide scale commercial utilization.

A high hydrogen storage capacity per unit weight of material is an important consideration in applications where the hydride does not remain stationary. A low hydrogen storage capacity relative to the weight of the material reduces the mileage and hence the range of the vehicle making the use of such materials impractical. A low desorption temperature is desirable to reduce the amount of energy required to release the hydrogen. Furthermore, a relatively low desorption temperature to release the stored hydrogen is necessary for efficient utilization of the available exhaust heat from vehicles, machinery, or other similar equipment.

Good reversibility is needed to enable the hydrogen storage material to be capable of repeated absorption-desorption cycles without significant loss of its hydrogen storage capabilities. Good kinetics are necessary to enable hydrogen to be absorbed or desorbed in a relatively short period of time. Resistance to contaminants to which the material may be subjected during manufacturing and utilization is required to prevent a degradation of acceptable performance.

The whole field of hydrogen storage material generally has been predicated on the idea that a particular single phase crystalline host material is required. Such prior art materials, however, have not been able to meet the above noted requirements necessary for wide scale commercial acceptance. A basic limitation of many of the prior art materials has been their low hydrogen storage capacity relative to the weight of the material. Another limitation is that many of these materials possess desorption temperatures which are undesirably high for many applications particularly those where engine exhaust heat is to be used to provide the desorption energy. Many of the prior art materials also have been quite susceptible to poisoning by exposure to contaminants in the hydrogen gas or from the ambient environment. For example, many crystalline materials can be poisoned by the presence of oxygen in parts per million concentrations. Once contaminated, the storage characteristics of the materials degrade significantly rendering these materials unacceptable for use without reactivating the materials, which is expensive and complicated. Resistance to contamination or poisoning is particularly necessary when using low cost, low grade hydrogen. For example, a low cost, low grade hydrogen is formed as a by-product of the chlorine-caustic industry. Also, in the fuure, hydrogen produced from coal may become widely utilized. Hydrogen produced from coal or as a by-product of the chlorine-caustic industry can have impurities which are capable of poisoning many of the prior art hydrogen storage materials.

In order to understand the limitations of the single phase crystalline materials of the prior art, it is necessary to understand the mechanics of storing hydrogen, in particular, as they relate to hydrogen storage in single phase crystalline host materials. The concepts generally utilized in dealing with these crystalline single phase materials are that hydrogen is stored in accordance with a simple reversible reaction of the metallic material M and gaseous H$_2$ to form a solid metal hydride MH$_n$, where n is an integer:

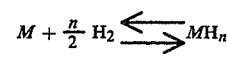

In one proposed theory, the mechanics of hydrogen storage are when gaseous hydrogen is brought in contact with a metal that forms a hydride, some of the ydrogen molecules are dissociated into hydrogen toms by interactions with catalytically active sites ppearing on the crystalline surface. Once the hydrogen dissociated it is then in a form which allows storage ithin the single phase crystalline host material. The ydrogen atoms enter the crystal lattice of the host material and occupy specific sites among the metal toms. Such storage sites in a crystalline structure are alled interstitial sites. These sites must have a certain minimum volume in order to easily accommodate the ydrogen atom. This imposes a severe limitation on the umber of hydrogen atoms that can be stored.

As the pressure of the gas is increased a limited number of hydrogen atoms are soluble in the single phase rystal structure. As the pressure is further increased a metal hydride phase occurs and the material begins to bsorb larger quantities of hydrogen. At this time the material is a mixture of metal M and metal hydride $MH_n$. In theory, ultimately all of the original hydrogen-aturated metal phase will be converted into the metal-ydride phase. Very few of the single phase crystalline ost materials, however, possess significant hydrogen orage capacities. None possess commercially acceptable capacity, while simultaneously possessing all the ther hydrogen storage characteristics which are required for widespread commercial utilization. A major mitation of single phase crystalline materials is the esult of a relatively low density of catalytically active tes and also a low density of interstitial storage sites in ich materials. The low density of such sites provide materials with less than desirable kinetics and hydrogen orage capacities.

In addition to a low density of catalytically active tes, the density of hydrogen storage sites or interstitial tes is limited due to specific stoichiometries in the ngle phase crystalline host structures. In single phase rystalline host materials the catalytically active sites re relatively very limited in number and result from ccidentally occurring surface irregularities which inrrupt the periodicity of the single phase crystalline ructure. A few examples of such surface irregularities re dislocation sites, crystal steps, surface impurities and reign absorbates. These irregularities typically only ccur in relatively few numbers on the surface of a ngle phase crystalline material and not throughout its ulk.

The density of catalytically active sites can be increased to a limited extent by mechanical cracking of the single phase crystalline structure or by forming a owder therefrom to increase the surface area. Also, owders can present a utilization problem, because hen the stored hydrogen is later released from the ydride, the powder particles may be included in the ydrogen gas as it is pumped to its point of utilization as fuel.

The prior art metallic host single phase crystalline ydrogen storage materials include magnesium, magnem nickel, vanadium, iron-titanium, lanthanum pennickel and others. No such prior art material, however, has all of the required properties i.e., storage caacity, acceptable desorption temperatures, etc. reuired for a storage medium with widespread commercal utilization. For example, a crystalline magnesium ydride is theoretically capable of storing hydrogen at pproximately 7.6% by weight computed using the rmula: percent storage = H/H + M, where H is the eight of the hydrogen stored and M is the weight of e material to store the hydrogen (all storage percentages hereinafter referred to are computed based on this formula). While a 7.6% storage capacity is suited for on board hydrogen storage for use in powering vehicles, magnesium's other hydrogen storage characteristics make it commercially unacceptable for widespread use.

Magnesium is very difficult to activate. For example, U.S. Pat. No. 3,479,165 discloses that it is necessary to activate magnesium to eliminate surface barriers at temperatures of 400° C. to 425° C. and 1000 psi for several days to obtain a reasonable (90%) conversion to the hydride state. Furthermore, desorption of such hydrides typically requires heating to relatively high temperatures before hydrogen desorption begins. The aforementioned patent states that the $MgH_2$ material must be heated to a temperature of 277° C. before desorption initiates, and significantly higher temperatures and times are required to reach an acceptable operating output. The high desorption temperature makes the magnesium hydride unsuitable for many applications, in particular applications wherein it is desired to utilize waste heat for desorption such as the exhaust heat from combustion engines.

The other aforementioned single phase crystalline materials also have not achieved commercial acceptance. Irontitanium hydride has a very low hydrogen storage capacity of only 1.75%. Other single phase crystalline prior art hydrogen storage materials all provide generally unacceptable storage capacity, for example $Mg_2NiH_2$, $VH_2$, $LaNi_5H_7$ have theoretical capacities of only 3.16%, 2.07% and 1.37%, respectively. In some of the prior art materials, another disadvantage has been the lack of ability to charge the materials in an acceptable amount of time. In summary, none of the prior art single phase crystalline host structures provide hydrogen storage material which has received commercial acceptance.

The whole field has been predicated on the fact that a particular crystalline structure is required, for example see Hydrogen Storage in Metal Hydride, *Scientific American*, Vol. 242, No. 2, pp. 118–129, February, 1980.

The present invention concerns itself with the influence of disorder on the properties of hydrogen storage materials, which premise is entirely different than that which has previously been utilized in the field.

SUMMARY OF THE INVENTION

The disadvantages of the prior art are overcome by providing disordered hydrogen storage materials which can be tailor-made to possess all the hydrogen storage characteristics which are desired for a wide range of commercial applications. The hydrogen storage materials of the present invention can have a greater hydrogen storage capacity than the single phase crystalline host materials. The bonding strengths between the hydrogen and the storage sites in these materials can be tailored to provide a spectrum of bonding possibilities to thereby obtain desired absorption and desorption characteristics. The materials of the present invention also have a greatly increased density of catalytically active sites which improve hydrogen storage kinetics and increase resistance to poisoning. Tailoring of the local structural and chemical order of the material of the present invention is of great importance to achieve the desired characteristics. Amorphous materials having only short range order can be utilized as can crysalline materials having long range order, but where the structure is deliberately modified to increase the density of catalytically active sites and hydrogen storage sites above that obtainable in the prior art.

The improved hydrogen storage characteristics of the present invention are accomplished by manipulating the local chemical order and hence the local structural order by the incorporation of selected modifier elements into a host matrix to create the desired disordered material. The desired multicomponent disordered material can be amorphous, polycrystalline (but lacking long range compositional order), or microcrystalline in structure or an intimate mixture of any combination of those phases.

The framework for the hydrogen storage materials of the present invention is a lightweight host matrix. The host matrix is structurally modified with selected modifier elements to provide a disordered material with local chemical environments which provide materials having the required hydrogen storage properties. Modification of the local chemical order of the host matrix by a lightweight modifier element provides a significant improvement in hydrogen storage capacity. Modification with a transition or rare earth element provides structurally modified local chemical environments which improve hydrogen absorption and desorption characteristics. The disordered materials of the present invention are designed to have a greatly increased number of active sites, thus increasing the resistance of the material to poisoning. Thus, the hydrogen storage characteristics of the disordered materials of the present invention can be controllably altered depending on the modifiers used to allow the tailor-making of hydrogen storage materials.

DETAILED DESCRIPTION

The present invention provides materials having tailor-made local chemical environments which are designed to yield greatly improved hydrogen storage characteristics. The manipulation of the local chemical environments of the materials is made possible by utilization of a host matrix which can, in accordance with the present invention, be structurally modified with other elements to create a greatly increased density of catalytically active sites for the dissociation of hydrogen molecules and an increased hydrogen storage capacity. This increase in hydrogen storage capacity can arise from an increase in the density of hydrogen storage sites or from a reduction in the weight of the storage material. Such disordered materials, unlike the specific and rigid structure of single phase crystalline host materials, are ideally suited for manipulation since they are not constrained by the symmetry of a single phase crystalline lattice or by stoichiometry. By moving away from materials having such restrictive single phase crystalline symmetry it is possible to accomplish a significant alteration of the local structural chemical environments involved in hydrogen storage to greatly enhance the hydrogen storage properties of the materials.

In the disordered materials of the present invention it is possible to obtain unusual electronic configurations resulting from nearest neighbor interactions between lone pairs, microvoids, dangling bonds, and unfilled or vacant orbitals. These unusual electronic configurations can interact with the modifier elements of the present invention which are incorporated into the host matrix. The modified local structural order and thus the electronic configurations of the matrix significantly increase the number of sites for hydrogen dissociation or hydrogen storage depending upon the modifier or modifiers and the non-equilibrium manner in which they are incorporated.

The disorder in the modified material can be of an atomic nature in the form of compositional or configurational disorder provided throughout the bulk of the material or in numerous regions of the material. The disorder also can be introduced into the host matrix by creating microscopic phases within the material which mimic the compositional or configurational disorder at the atomic level by virtue of the relationship of one phase to another. For example, disordered materials can be created by introducing microscopic regions of a different kind or kinds of crystalline phases, or by introducing regions of an amorphous phase or phases, or by introducing regions of an amorphous phase or phases in addition to regions of a crystalline phase or phases. The interfaces between these various phases can provide surfaces which are rich in local chemical environments which provide numerous desirable sites for hydrogen dissociation and/or storage.

The disordered materials of the present invention all have less order than the highly ordered crystalline structures which provide the single phase host matrices used for hydrogen storage in the prior art. The types of disordered structures which provide the local structural chemical environments for improved hydrogen storage characteristics in accordance with the present invention include multicomponent polycrystalline materials lacking long range compositional order, microcrystalline materials, amorphous materials having one or more phases or multiphase materials containing both amorphous and crystalline phases or mixtures thereof.

As described later in greater detail, one class of modifier elements, the transition or rare earth modifier elements, can be incorporated into the host matrix to modify its local structural chemical environments to provide an increased density of catalytically active sites for dissociating hydrogen molecules. These modifiers can also create hydrogen storage sites at which hydrogen atoms can be stored with a lower bonding energy thus lowering the temperature required for desorption. A second type of modifier, a lightweight modifier element, is capable of structurally modifying local chemical environments to provide an increased number of storage sites.

The host matrix of the present invention is capable of being structurally modified to improve hydrogen storage capacity independently of improving absorption and desorption temperatures and kinetics. This is because some modifier elements are incorporated in the host matrix to alter the local structural chemical environments and hence increase the number of catalytically active sites with the primary effect of improving absorption and desorption kinetics and lowering absorption and desorption temperatures while other elements are incorporated into the matrix with the primary effect of increasing the density of sites for storage. Furthermore, modification by the lightweight elements to improve hydrogen storage capacity of the host matrix does not deleteriously effect absorption and desorption temperatures and kinetics. In fact, the absorption and desorption temperatures and kinetics of the modified material are actually improved, although not nearly to the same extent as provided by modification with the transition or rare earth elements. Conversely, modification by a transition or rare earth element to improve absorption and desorption temperatures and kinetics, also increases hydrogen storage capacity although not nearly to the extent possible by modification with the lightweight elements. As it will be shown by the examples, modification with some lightweight elements such as aluminum, also decreases the hydrogen bonding energy to provide materials with significantly lower desorption temperatures as well as a significantly increased hydrogen storage capacity.

Another advantage of employing a disordered material is that with such materials catalytically active sites can be distributed throughout the bulk of the material. In a single phase host crystalline structure the catalytically active sites are limited to a relatively few accidentally occurring irregularities appearing on the surfaces of the material. In a modified disordered material the locations of catalytically active sites are not limited to just the surfaces of the material. In contrast to the single phase crystalline structure, the materials of the present invention have three dimensional disorder with active sites distributed throughout the bulk of the material. They provide a substantially increased surface area which does not depend merely on the presence of cracks, voids and grain boundaries. The hydrogen storage materials of the present invention have a greatly increased density of catalytically active sites which provides a significant improvement of hydrogen absorption and desorption kinetics during utilization as a hydrogen storage medium.

In addition to the increased density of catalytically active sites for hydrogen dissociation, the disordered materials also possess an increased density of sites at which hydrogen atoms can be stored. The disordered materials are not limited to merely interstitial storage of hydrogen as is the case with single phase crystalline materials. Instead, the hydrogen atoms are stored at the sites created by the local chemical environments of the host matrix which are modified in accordance with this invention to provide the increased number of hydrogen storage sites.

Another advantage of the host matrix of the present invention is that it can be modified in a substantially continuous range of varying percentages of modifier elements. This ability allows the host matrix to be manipulated by modifiers to tailor-make or engineer hydrogen storage materials with characteristics suitable for particular applications. This is in contrast to multi-component single phase host crystalline materials which generally have a very limited range of stoichiometry available. A continuous range of control of chemical and structural modification of the thermodynamics and kinetics of such crystalline materials therefore is not possible.

Porosity also can be an important parameter for the hydrogen storage materials. Porosity can be designed into the disordered materials of the present invention. The porosity can be controlled during formation of the material or after formation of the material.

Another advantage of the hydrogen storage materials of the present invention is that they are much more resistant to poisoning. As stated before, the materials of the present invention have a much greater density of catalytically active sites. Thus, a certain number of such sites can be sacrificed to the effects of poisonous species while the large number of unpoisoned active sites still remain to continue to provide the desired hydrogen storage kinetics.

Another advantage of these disordered materials is that they can be designed to be mechanically more flexible than single phase crystalline materials. The disordered materials are thus capable of more distortion during expansion and contraction allowing for greater mechanical stability during the absorption and desorption cycles.

The specific elements utilized in forming the hydrogen storage materials of the present invention are hereinafter described. The host matrix providing the framework for the disordered materials is a solid lightweight element. As discussed previously, for mobile hydrogen storage applications a high storage capacity per weight of storage material is necessary for widespread commercial utility. Therefore a host matrix of a solid lightweight element is utilized in the present invention to achieve this result. A "lightweight element" as used herein includes any of those elements which have an atomic number of 22 or less. For example, for utilization in the host matrix elements such as magnesium, silicon, aluminum, boron, calcium and carbon can be used.

To increase the hydrogen storage capacity of the host matrix, at least one other lightweight element can be incorporated into the host matrix to modify the local structural chemical environments of the matrix to greatly increase the density of hydrogen storage sites. Preferably, the modifier element has a lighter weight than the host matrix element. The addition of a lighter weight element offers the advantage of decreasing the density of hydrogen storage material without decreasing the density of active sites, thus providing and increased percent storage of hydrogen relative to the weight of the material. The incorporation of the lightweight element however, is primarily to structurally modify the local chemical environments which increases the weight percent hydrogen storage capacity of the resulting disordered material beyond that expected by a mere reduction in the density of the material.

Modification of the host matrix with at least one transition or rare earth element provides an increased quantity of catalytically active sites. Such modification also provides a wide spectrum of bonding possibilities such as lower bonding energies between the hydrogen atoms and the storage sites. Such a bonding spectrum is not possible in single phase host crystalline structures wherein the covalent bonding is very specific and uniform. This bonding spectrum allows the hydrogen atoms to be absorbed and desorbed at lower temperatures, which is particularly important for applications where desorption energy is to be provided by waste heat.

Small amounts of the transition and rare earth elements are particularly suitable as modifiers by virtue of the d and f band orbitals possessed by these elements. Modification of the host matrix with d or f band elements has a profound effect on the non-equilibrium electronic properties of the local structural chemical order of the material. For example, the density of states is greatly increased at the Fermi level by interactions of d band orbital states of the elements with other d band orbitals of other modifying elements interspersed throughout the modified materials of the present invention. Thus, the desorption temperature and kinetics can become an independently controllable parameter depending upon the element or elements used for modification and the percent thereof incorporated into the host matrix.

STORAGE MATERIAL PREPARATION

A number of hydrogen storage materials were prepared in accordance with the teachings of the present invention. These materials were tested to determine storage capacity, absorption and desorption rates, and absorption and desorption temperatures. As results discussed below will indicate, the modified disordered materials of the present invention provided hydrogen storage materials with improved hydrogen storage capacity, improved kinetics and desired desorption temperatures. Furthermore, it can be seen that modification of the host matrix can improve desorption properties without a deleterious effect on hydrogen storage capacity and vice versa.

The host matrix element utilized to verify the principles of the invention was magnesium although as discussed above, other solid elements can be utilized as the host matrix. Various elements were used to modify the magnesium matrix to improve its hydrogen storage characteristics. Examples of the lightweight modifier elements used to increase hydrogen storage capacity include carbon, aluminum and oxygen. As the following tables will show, in some instances only one lightweight modifier was incorporated while in other instances a plurality of such lightweight modifiers were used. To improve the hydrogen desorption properties of the host matrix, various transition element modifiers were used including, for example, iron, copper and nickel. As with the lightweight modifiers, in some instances the modification of the host matrix was performed with only one transition element while in other instances a plurality of such modifiers were used. Certain of the materials were also prepared wherein the host matrix was selectively modified with both a lightweight element and transition element.

The method selected for the material preparation was sputtering. Sputtering methods are advantageous for material optimization since it is a relatively fast method of producing different materials to thereby allow a fast screening of the various materials to determine their hydrogen storage characteristics. Sputtering also is a desirable method for preparing the materials, because it lends itself to the production of the disordered materials and allows an intimate mixing of the host matrix element and modifier elements on an atomic scale so that local order chemical modification can readily take place. Although sputtering techniques are described in detail, any of the allied bulk techniques which result in the same type of disordered materials are also applicable within the scope of the invention. The sputtering techniques are applicable for commercial production of some applications of hydrogen storage materials.

The samples were prepared utilizing either a Veeco R.F. Sputtering Unit or a Sloan SL 1800 Magnetron Sputtering System. An advantage of the particular Sloan system over the Veeco unit, is that it can accommodate more than one target and thus each element sputtered can have a separate dedicated target. The Veeco unit is a single target unit and to accomplish sputtering of more than one element, the target was comprised of multiple elements. Thus, by the Veeco target was comprised of a magnesium base with sections of desired modifier elements attached to the base.

One or more substrates were positioned in the vacuum chamber of the sputtering machine employed and the chamber was evacuated to a background pressure of typically approximately $1 \times 10^{-6}$ torr. Typically, argon gas was introduced into the chamber at a partial pressure of approximately $6.0 \times 10^{-3}$ torr. The relative percentages of elements contained in the materials codeposited on the substrate were controlled in a different manner depending upon the sputtering machine used. On the Sloan machine, the relative percentages were controlled by varying the magnitude of magnetic flux associated with each target. On the single target Veeco the composition of the deposited material was controlled by the relative percentages of elemens on the exposed surface of the target and the placement of substrates relative to the target. In some instances, the deposition of the elements sputtered was in the presence of a reactive gas, for example, oxygen or methane so as to incorporate oxygen or carbon atoms as modifiers in the deposited material. This technique was particularly useful for incorporating gaseous elements into the disordered material.

ACTIVATION

Activation as used herein is essentially the process of obtaining the initial absorption of hydrogen in the storage material. A subsequent absorption of hydrogen after the initial absorption process and desorption is referred to as charging. The distinction is made because the initial absorption or activation of a material typically is more difficult than later chargings. One theory proposes that during activation the storage material's surface skin barrier formed during manufacturing of the material must be broken down to allow better access of the hydrogen into the material. A subsequent charging process to provide approximately the same or greater amount of hydrogen absorption can be accomplished much more quickly and with a much less involved process since the material's barriers have been eliminated by the prior activation.

To provide consistency for comparing the relative performance of the materials, each material was activated in substantially the same manner. Typically, the activation process was performed as follows:

(1) The material was placed in a stainless steel reaction vessel and the vessel was evacuated to a pressure of $10^{-5}$ torr, (2) the vessel was heated for one hour at 200° C., (3) hydrogen was introduced in the reaction vessel at a pressure of 1000 psig, (4) the vessel was heated for three hours at 400° C., (5) the temperature of the vessel was reduced to 300° C. for one hour, (6) the vessel temperature was reduced to 200° C. and this condition was maintained overnight, (7) the hydrogen gas was vented while the temperature was maintained at 200° C., and (8) the vessel was evacuated to a pressure of $10^{-5}$ torr and the temperature gradually raised to 300° C. and maintained for approximately thirty minutes. Subsequently, an additional two to four cycles of steps three through eight of the above process were performed to complete the activation procedure.

It should be understood that the above method of activation was used primarily to standardize test results and should not be thought of as required in its entirety. For example, it was found that only two cycles of the above procedure could substantially fully activate a material. Furthermore, these cycles were accomplished at a reduced pressure of 500 psig for Step 3 and a reduced temperature of 350° C. for Step 4. Further reductions in the activating process procedure is believed possible with the hydrogen storage materials of this invention, but in any case is not felt to be a critical parameter to the invention.

TESTING

Various tests were made to determine the performance of the designed materials. These included desorption tests performed to determine the percent by weight of the hydrogen stored within the material. The desorption tests also provided information as to the initial desorption temperatures and the typical desorption temperatures at which the hydrogen is released in a relatively short period of time. A chemical analysis was performed on the samples to determine composition. Many of the samples were also tested by X-ray diffraction to determine the degree of disorder in the hydrogen storage materials which results were in accordance with the present invention. Tests were also run on some of the materials to determine the reversibility of the disordered materials of the present invention.

TABLE I

Mg Modified with Carbon and Oxygen

| Material Composition (Atomic Percentages) | Percent by weight Storage | Typical Desorption Temperatures °C. |
|---|---|---|
| $Mg_{75.3}C_{7.0}O_{17.8}$ | 8.21 | 340° |
| $Mg_{80.2}C_{16.7}O_{3.1}$ | 11.7 | 400° |
| $Mg_{87.5}C_{10.3}O_{2.2}$ | 7.9 | 340° |
| $Mg_{92}C_{5.9}O_{2.1}$ | 8.04 | 340° to 500° |
| $Mg_{96.2}C_3O_8$ | 8.0 | 340° |

Table I shows representative results of a magnesium matrix modified with carbon and oxygen. The $Mg_{80.2}C_{16.7}O_{3.1}$ material provided an excellent storage capacity of 11.7%. The absorption kinetics of the materials during charging were also found to be very good. For example, the $Mg_{80.2}C_{16.7}O_{3.1}$ material was charged by placing it in a reaction vessel at 400° C. with hydrogen gas under a pressure of 1000 psig. The material absorbed 90% of the ultimate capacity in only one minute of charging under those conditions. Ninety-five percent of its capacity was absorbed in ninety minutes. For reference, full capacity was considered as the amount of hydrogen absorbed by the material during the initial activation procedure. Desorption kinetics were also determined for the material. At a desorption temperature of 400° C., almost 60% of capacity was released in the first ten minutes, about 80% in thirty minutes and 100% in approximately ninety minutes. This material had a disordered mixed phase amorphous and crystalline structure. The disordered structure provided local chemical environments which were modified by the carbon and oxygen atoms to provide an increased density of storage sites. This sample provided storage capacity which was 4.1% by weight greater than that theoretically possible with a single phase host crystalline magnesium structure.

TABLE II

Mg modified with Fe

| Material Composition (Atomic Percentages) | Percent by weight Storage | Typical Desorption Temperatures °C. |
|---|---|---|
| $Mg_{90}Fe_{10}$ | 2.20 | 400° |
| $Mg_{70.5}Fe_{29.5}$ | 4.00 | 320° |
| $Mg_{54.6}Fe_{45.4}$ | 3.64 | 320° |
| $Mg_{41.5}Fe_{58.5}$ | 2.3 | 320° |
| $Mg_{30}Fe_{70}$ | 0.8 | 320° |

Table II shows some results of modification of the lightweight matrix of magnesium with a transition element, such as iron. This material exhibits several desired characteristics. For example, the absorption and desorption kinetics are significantly improved over that of the single phase crystalline magnesium structure. For example, about 90% of capacity was released in less than one hour from the $Mg_{54.6}Fe_{45.4}$ material. As the percentage of iron is increased from 10 to about 30 atomic percent, the initial desorption temperatures of the materials are lowered and simultaneously the storage capacity of the materials are steadily increased. Beyond about 30 atomic percent the storage capacity of the materials starts to decrease. It should be noted also, that these materials cannot be made by conventional techniques and are therefore unique materials.

TABLE III

Mg modified with Fe and Al

| Material Composition (Atomic Percentages) | Percent by weight Storage | Typical Desorption Temperatures °C. |
|---|---|---|
| $Mg_{59.8}Al_{10.5}Fe_{29.7}$ | 5.0 | 300° |
| $Mg_{69.2}Al_{9.3}Fe_{21.5}$ | 6.5 | 270° |
| $Mg_{70.8}Al_{21.7}Fe_{7.5}$ | 4.3 | 300° |
| $Mg_{83.2}Al_{8.6}Fe_{8.2}$ | 5.6 | 300° |
| $Mg_{89.1}Al_{6.5}Fe_{4.4}$ | 6.2 | 300° |
| $Mg_{93.5}Al_{2.6}Fe_{3.9}$ | 6.2 | 300° |

Table III shows some results of simultaneous modification of a lightweight matrix, such as magensium, with a transition element, such as iron and a lightweight element, such as aluminum. The addition of the lightweight modifier element increases the storage capacity and the adsorption and desorption kinetics over the MgFe system shown in Table II.

Furthermore, all of the MgFeAl materials tested have low initial desorption temperatures in the range of 170° C. to 200° C. For example, $Mg_{93.5}Al_{2.6}Fe_{3.9}$ absorbed approximately 5.5% hydrogen by weight in about one hour at a temperature of 255° C. and at a pressure of 30 psig. At a desorption temperature of 300° C. almost 90% of hydrogen capacity was released in about one hour. The low initial desorption temperatures and the improved kinetics are advantageous for controlling the rate of release of hydrogen.

TABLE IV

Mg modified with C, O and Cu

| Material Composition (Atomic Percentages) | Percent by weight Storage | Typical Desorption Temperatures °C. |
|---|---|---|
| $Mg_{52}C_{15.4}Cu_{22.6}O_{10}$ | 5.6 | 280° |
| $Mg_{61.6}C_{14.2}Cu_{15.3}O_{8.9}$ | 5.9 | 300° |

Table IV shows the advantages of modifying the MgCO system with copper which improves the absorption and desorption kinetics. Modification with copper provided a 5.6% storage capacity and a desorption temperature of 300° C. or less.

In addition to the specific examples set forth above, other solid lightweight host elements can be substituted for or combined with the elements specified in preparing the materials of the invention. For example, these elements include Si, Al, B, C, Ca, Sc, Ti, Li, Na, K and Be.

In addition to the specific modifier elements set forth above, other modifier elements can be substituted for or combined with the elements specified in preparing the materials of the invention. For example, transition elements include Zn, Ni, Mo, Cr and W. In addition, small amounts of the more costly transition elements such as Ag and Au can be utilized. Also, small amounts of the heavy transition and rare earth elements, such as La and Ce also can be utilized.

A number of the materials were subjected to repeated cycling tests on the order of twenty absorption-desorption cycles. These materials did not show any degradation during such testing, but instead, the materials actually showed slight increases in hydrogen storage capacity over that obtained in the initial activation cycle. Some of the materials were intentionally subjected to poisons, such as carbon monoxide and methane, which did not degrade the hydrogen storage capacity of the materials.

While the present invention has been described in conjunction with specific embodiments, those of normal skill in the art will appreciate that modifications and variations can be made without departing from the scope of the present invention. While the above examples have shown production of the hydrogen storage materials by sputtering techniques, the invention is not so limited. For some types of commercial applications other production methods can be more desirable. Such modifications and variations are envisioned to be within the scope of the claims.

What is claimed and desired to be secured by Letters Patent of the United States is:

1. A multicomponent compositionally disordered material for reversibly storing hydrogen, comprising:
   a first element comprising at least one solid lightweight element forming a host matrix; and
   said host matrix having incorporated therein at least one modifier element, said modifier element structurally modifying said host matrix to provide said disorder which enhances the hydrogen storage characteristics.

2. The disordered hydrogen storage material as defined as in claim 1 wherein said modifier element is another lightweight element, said lightweight element modifying the local order chemical environments to provide an increased density of hydrogen storage sites which are capable of interacting with hydrogen atoms to store said atoms at said sites to thereby increase the hydrogen storage capacity of said material.

3. The disordered hydrogen storage material as defined in claim 1 wherein said modifier element is a transition or rare earth element, said element modifying the local order chemical environment to provide an increased density of catalytically active sites which are capable of dissociating hydrogen molecules into hydrogen atoms to thereby increase the rate at which said hydrogen molecules can be dissociated.

4. The hydrogen storage material as defined in claim 1 wherein said modifier element is a transition or rare earth element, said modifier element interacting with the local order chemical environments to provide a modified local order environment, said modified environments capable or interacting with hydrogen atoms to reversibly store said atoms at said modified environment at a lower bond energy relative to an unmodified local order environment to reduce the temperature required to desorb hydrogen atoms from said modified local order environments.

5. The hydrogen storage material as defined in claim 1 wherein said disordered material is substantially polycrystalline multicomponent material lacking long range compositional order.

6. The hydrogen storage material as defined in claim 1 wherein said disordered material is a substantially microcrystalline material.

7. The hydrogen storage material as defined in claim 1 wherein said disordered material is a mixture of polycrystalline or microcrystalline phase regions and amorphous phase regions.

8. The hydrogen storage material as defined in claim 1 wherein said disordered material is an amorphous material containing at least one amorphous phase.

9. The hydrogen storage material as defined in claim 1 wherein said disordered material is a mixture of microcrystalline and polycrystalline phases.

10. The hydrogen storage material as defined in any one of claims 1–9 wherein said first element is selected from the group consisting of Mg, Ca, Si, Al, B and C.

11. The hydrogen storage material as defined in anyone of claims 1, or 3–9 wherein said modifier element is selected from the transition element group consisting of Fe, Cu, Mo and Ni.

12. The hydrogen storage material as defined in anyone of claims 1, 2 or 5–9 wherein said modifier element is aluminum.

13. The hydrogen storage material as defined in anyone of claims 1, 2 or 5–9 wherein said modifier element is carbon.

14. The hydrogen storage material as defined in anyone of claims 1, 2 or 5–9 wherein said modifier element is oxygen.

15. A method of making an improved hydrogen storage material, comprising:
   forming a host matrix from a solid lightweight element, and
   structurally modifying said host matrix by incorporating therein at least one modifier element to provide a disordered material which enhances the hydrogen storage characteristics.

16. The method of claim 15 further including:
   increasing the hydrogen storage capacity of said material by incorporating a lightweight modifying element into said matrix, said lightweight element increasing the density of hydrogen storage sites.

17. The method of claim 15 further including:
   increasing the absorption rate of said material by incorporating a transition or rare earth modifying element into said matrix, said modifying element increasing the density of catalytically active sites.

18. The method of claim 15 further including:
   lowering the desorption temperature of said material by incorporating a rare earth or transition modifier element into said matrix, said modifying element providing a spectrum of bonding energy in said material.

19. The method of claim 15 further including:
   forming said disordered material into a substantially polycrystalline multicomponent material lacking long range compositional order.

20. The method of claim 15 further including:
   forming said disordered material into a substantially microcrystalline material.

21. The method of claim 15 further including:
   forming said disordered material into a mixture of polycrystalline or microcrystalline phase regions and amorphous phase regions.

22. The method of claim 15 further including:
   forming said disordered material into a material containing at least one amorphous phase.

23. The method of claim 15 further including:
   forming said disordered material into a material containing a mixture of microcrystalline and polycrystalline phases.

* * * * *

UNITED STATES PATENT AND TRADEMARK OFFICE
CERTIFICATE OF CORRECTION

PATENT NO. : 4,431,561
DATED : February 14, 1984
INVENTOR(S) : Ovshinsky et al.

It is certified that error appears in the above-identified patent and that said Letters Patent is hereby corrected as shown below:

In the Abstract, line 11, delete "a" (second occurrence) and insert --an--.

Column 2, line 45, delete "fuure" and insert --future--.

Column 4, line 25, delete "Irontitanium" and insert "Iron-titanium--.

Column 4, line 66, delete "crysalline" and insert --crystalline--.

Column 8, line 29, delete "and" and insert --an--.

Column 9, line 26, delete "were" and insert --was--.

Column 9, line 33, delete "were" (first occurrence) and insert --was--.

Column 9, line 62, delete "by".

Column 10, line 10, delete "elemens" and insert --elements--.

Column 11, line 11, delete "performd" and insert --performed--.

Column 12, line 29, delete "magensium" and insert --magnesium--.

Column 12, line 33, delete "adsorption" and insert --absorption--.

UNITED STATES PATENT AND TRADEMARK OFFICE
CERTIFICATE OF CORRECTION

PATENT NO. : 4,431,561
DATED : February 14, 1984
INVENTOR(S) : Ovshinsky et al.

It is certified that error appears in the above-identified patent and that said Letters Patent is hereby corrected as shown below:

Column 13, line 40, delete "as".

Column 14, lines 20, 23 and 26, delete "any-'' and insert --any--.

Signed and Sealed this

Fifteenth Day of October 1985

[SEAL]

Attest:

DONALD J. QUIGG

Attesting Officer

Commissioner of Patents and Trademarks—Designate